Patented Sept. 15, 1931

1,823,335

UNITED STATES PATENT OFFICE

PAUL H. RICHERT, OF BERKELEY, CALIFORNIA

METHOD OF MANUFACTURING SPONGE RUBBER

No Drawing.    Application filed April 29, 1929.   Serial No. 359,176.

This invention relates to a method of compounding or preparing rubber preparatory to vulcanizing the same, and especially to a method of compounding or preparing rubber intended for the manufacture of sponge rubber articles and the like.

In the manufacture of sponge rubber a gassing agent or compound capable of liberating gases at the temperature of vulcanization is required, as it is the gas liberated that produces the cellular structure characteristic of sponge rubber.

A number of gassing agents have been employed, such as ammonium carbonate, etcetera, but they are not altogether satisfactory as decomposition and liberation of gas takes place to a large extent prior to vulcanization. That is, considerable heat is evolved, while the rubber is being plasticized between the mixing rolls of a mill, and while other compounding ingredients such as fillers etc. are being added.

In order to insure the retension of at least a minimum amount of gas liberating constituents during the mixing operation, it has been customary to use a large excess of the material. This not only causes a waste of material, that is the gassing agent, but a far more serious result is variation in results, as successive batches due to more or less liberation of gas prior to vulcanization differ in quality and texture. In other instances the gassing agent is not added until the mixing in the mill is practically completed. Even then it is necessary to rerun the entire batch to insure thorough distribution of the gassing agent throughout the entire mass. Time is lost by this method of mixing, a certain amount of gas is liberated as heat is again generated between the mixing rolls, and the final result is again variable.

Due to the fact that gas is liberated in varying quantities regardless of the mixing method employed, it is practically impossible to obtain a finished sponge rubber product having a predetermined cellular structure or texture.

I have discovered that the gas losses encountered are entirely due to the fact that a gassing agent is employed which decomposes at comparatively low temperatures, for instance, a temperature of 160° to 180° Fahrenheit is often reached in the mixing mill, and if a gassing agent of this character is employed it starts to decompose or evolve gas at or near such temperatures. Gas losses and a variable product are therefore only to be expected.

I have also discovered a gassing agent which will not decompose below 200° Fahrenheit, and when an agent of this character is used it is possible to obtain a finished sponge rubber of uniform cellular structure, and possessing cells closely approaching a predetermined number and size per unit of volume.

The gassing agents or compound employed are sulfites of ammonia, such as:

Ammonium sulfite $(NH_4)_2SO_3.H_2O$
Ammonium bi-sulfite $NH_4HSO_3$
Ammonium meta-bi-sulfite $(NH_4)_2S_2O_5$ or any compound of this character which will decompose under a vulcanizing temperature, but remain stable below or near 200° Fahrenheit.

In the preparation of rubber for the manufacture of sponge rubber articles I add approximately two pounds of ammonium sulfite to sixty pounds of the rubber compound to be employed. The ammonium sulfite is preferably ground, and may be added at any time during the mixing operation, but as there is no danger of decomposition taking place, it is preferable to add it before the addition of other compounding ingredients if they are employed, as thorough distribution and a uniform product is thereby insured. After the mixing is completed the compounded material is ready for vulcanization in the usual manner.

The proportions of gassing agent to rubber, as above stated, may be varied over a wide range, depending upon the number of cells desired per unit volume and the size of the cells may be varied by grinding the gassing compound coarser or finer, the coarser ground material producing larger cells.

In actual practice I have found that the gassing agent employed is suitable for a great variety of sponge rubber articles, such as semi-hard sponge rubber, soft sponge rubber etc.

It is accordingly understood that I do not limit myself solely to one variety or another, nor to sponge rubber alone, as the gassing agent may be employed whenever it is desired to incorporate a material whose decomposition below the vulcanizing temperature is to be avoided.

Having thus described my invention, what I claim and desire to secure by Letters Patent is:

1. The herein described method of forming cells in rubber during vulcanization thereof which consists in introducing into the rubber during plasticization thereof a sulfite of ammonia, and then subjecting the rubber to sufficient temperature to decompose the sulphite of ammonia and to vulcanize the rubber.

2. The herein described method of forming cells in rubber during vulcanization thereof which consists in introducing into the rubber during plasticization thereof a ground sulfite of ammonia, and then subjecting the rubber to sufficient temperature to decompose the sulphite of ammonia and to vulcanize the rubber.

3. The herein described method of forming cells in rubber during vulcanization thereof which consists in introducing into the rubber during plasticization thereof a ground ammonium bi-sulphite, and then subjecting the rubber to sufficient temperature to decompose the bi-sulphite and to vulcanize the rubber.

4. In the manufacture of sponge rubber, the method of forming cells in the rubber which comprises adding to the rubber a sulphite of ammonia during the plasticization thereof, and subsequently exposing the combination of said rubber and said suphite of ammonia to a volatilizing temperature.

PAUL H. RICHERT.